US006298954B1

(12) United States Patent
Weiler et al.

(10) Patent No.: US 6,298,954 B1
(45) Date of Patent: Oct. 9, 2001

(54) BRAKE CALLIPER, IN PARTICULAR FOR MOTOR VEHICLES

(75) Inventors: Rolf Weiler, Eppstein; Andreas Döll, Frankfurt, both of (DE)

(73) Assignee: Continental Teves AG & Co, oHG, Frankfurt (DE)

( * ) Notice: Subject to any disclaimer, the term of this patent is extended or adjusted under 35 U.S.C. 154(b) by 0 days.

(21) Appl. No.: 09/319,766

(22) PCT Filed: Nov. 26, 1997

(86) PCT No.: PCT/EP97/06588

§ 371 Date: Oct. 15, 1999

§ 102(e) Date: Oct. 15, 1999

(87) PCT Pub. No.: WO98/27353

PCT Pub. Date: Jun. 25, 1998

(30) Foreign Application Priority Data

Dec. 14, 1996 (DE) .............................. 196 52 123

(51) Int. Cl.$^7$ .................................... F16D 55/00
(52) U.S. Cl. ................... 188/71.1; 188/73.1; 188/370
(58) Field of Search ................... 188/71.1, 73.1, 188/370, 73.41, 264 R, 264 A, 264 AA

(56) References Cited

U.S. PATENT DOCUMENTS

| 3,556,265 | 1/1971 | Shakespear . |
| 3,626,580 | 12/1971 | Shakespear . |
| 3,881,576 | * 5/1975 | Haraikawa et al. ............. 188/73.5 |
| 4,102,440 | * 7/1978 | Wood ............................. 188/73.1 |
| 4,318,460 | 3/1982 | Kosinski . |
| 4,345,675 | 8/1982 | Ritsema . |
| 5,282,521 | * 2/1994 | Leist et al. ................... 188/73.47 |
| 5,394,963 | * 3/1995 | Deane et al. ................... 188/71.1 |
| 5,472,068 | * 12/1995 | Weiler et al. ................... 188/71.1 |
| 5,558,183 | * 9/1996 | Way ................................. 188/71.6 |

FOREIGN PATENT DOCUMENTS

| 14 80 132 | 5/1969 | (DE) . |
| 19 48 732 | 4/1970 | (DE) . |
| 32 33 684 | 4/1983 | (DE) . |
| 33 22 232 | 3/1984 | (DE) . |
| 44 02 394 | 10/1992 | (DE) . |
| 44 20 652 | 12/1994 | (DE) . |
| 5 215157 | 8/1993 | (JP) . |

OTHER PUBLICATIONS

Bode, Karl–Heinz: Konstruktions–Atlas, 4 überanb. Erweit. Aufl., Hoppenstedt Technik Tabellen Verlag, Darmstadt, 1988, p. 27.

* cited by examiner

Primary Examiner—Robert J. Oberleitner
Assistant Examiner—Robert A. Siconolfi
(74) Attorney, Agent, or Firm—Rader, Fishman & Grauer PLLC

(57) ABSTRACT

A brake caliper has a caliper bridge and two legs that are arranged at right angles to the caliper bridge. A housing having a bore for a brake piston is mounted on one leg. The caliper bridge has at least one hollow chamber inside, which is delimited on all sides by supporting walls. Even though the brake caliper exhibits considerable flectional strength it is lightweight.

3 Claims, 3 Drawing Sheets

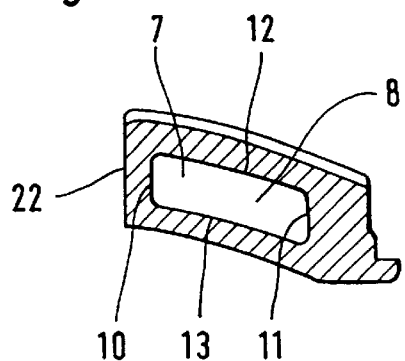
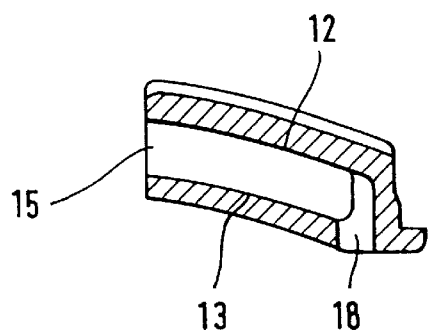
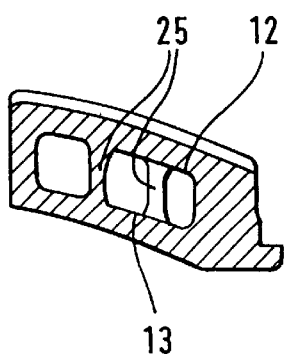
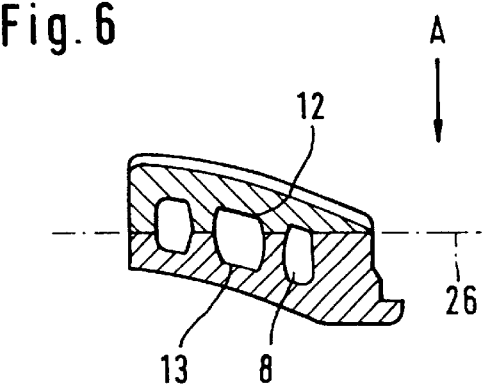
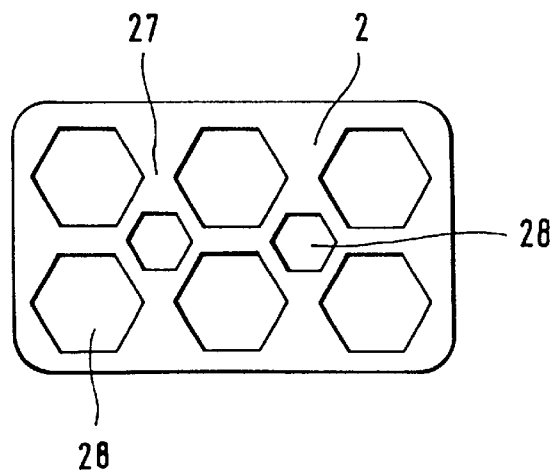

BRAKE CALLIPER, IN PARTICULAR FOR MOTOR VEHICLES

The present invention relates to a brake caliper, in particular one for use in motor vehicles, wherein said caliper bridge has two legs arranged at right angles to it and a housing with a bore for an actuating cylinder mounted on one of the legs.

These types of brake calipers are generally known and are relatively heavy. This is generally considered a disadvantage because, on the one hand, the weight of the brake caliper has a direct influence on the total weight of the vehicle and, on the other hand, it detrimentally affects the operating and suspension characteristics of the chassis since it represents additional mass. Consequently, many efforts have been made to reduce the weight of brake calipers. For example, aluminum materials are used in many cases since aluminum has a low specific weight; yet it also has a low load capacity and low stiffness with regard to load. Consequently, this lack of adequate strength and rigidity has to be compensated by larger cross-sections. However, larger cross-sections, particularly in the area of the caliper bridge, mean that the permissible diameter of the brake disk has to be reduced, and this in turn has a negative effect on the braking power.

Therefore the object of the present invention is to provide a brake caliper with flectional strength that exhibits low weight as well as small material cross-sections in the vicinity of the caliper bridge, so that the diameter of the brake disk can be as large and effective as possible.

Another purpose of the present invention, is to provide a simple way of manufacturing such a brake caliper.

These objects are solved by means of the characterizing features of Patent claim 1 in that at least one hollow chamber is provided within the caliper bridge and this hollow chamber is delimited on all sides by supporting surfaces.

The present invention offers the advantage that the brake caliper does not have a solid cross-section but rather a closed hollow section with essentially the same flectional strength as a solid cross-section. In view of these characteristics a considerable reduction in weight and low space requirements can be achieved. The brake caliper with a hollow cross-section according to the present invention can be produced at low cost by casting and does not require any machining operations.

In an advantageous embodiment of the invention each chamber has at least one outlet leading to the outside and such outlet can be used to introduce and remove a casting core in order to produce the chamber. Moreover, each outlet can be used for ventilation and draining purposes during production and operation. In a particularly advantageous embodiment of the invention, two outlets are arranged diagonally to one another in each chamber, in which case draining is especially reliable and quick.

Another advantageous embodiment of the invention provides that the caliper bridge exhibit two chambers and an opening between the two chambers, with the outlets running into this opening. During production of the caliper, the opening serves as a place of accommodation for the cores of the chambers lying opposite each other. This also provides the possibility of using a single one-piece core for producing the chambers.

In a further embodiment of the invention, the opening between the chambers has ribs along the side walls, with such ribs being in alignment with the upper and lower walls. The ribs reinforce the overall structure and provide more flectional strength to the connection of the leg that is mounted between the two chambers on the side of the fist.

Another advantageous embodiment of the invention provides that each chamber have struts extending from the radial upper wall to the radial lower wall. The struts can be made in the course of the casting procedure by designing the cores correspondingly and give the brake caliper higher resistance to bending stress.

In an embodiment according to Patent claim 11 the brake caliper is designed in two parts, with the mould joint running at a right angle to the cylinder axis on the side of the housing. With this design it is possible to use different materials for the housing and the fist of the brake caliper. Thus, it is possible, for example, to make the fist of steel and the housing of aluminum.

In another advantageous embodiment of the invention the brake caliper is designed in two parts, with the mould joint running parallel to the cylinder axis. The two halves of the caliper are welded together along the mould joint by means of electron-beam welding. The highly focused electron beam ensures that, for one, the two halves are joined together securely along their entire cross-section and, for another, results in an extremely limited heat affected zone along the edges of the welding seam so that thin cross-sections, in particular near the chambers, can retain their original and unchanged material characteristics.

According to Patent claim 14, a process for producing a brake caliper according to the present invention is proposed. In this case, a core with undercuts and a core print is moulded by casting in a mould with moulding materials. The core print is located within the area of an opening of the caliper bridge, and after being cast in a mould the core and the undercuts are expelled through an outlet in the chamber.

Examples of embodiments of the present invention are shown in the following figures and described in more detail below:

FIG. 3 shows a section along line III—III of FIG. 1 in a different scale.

FIG. 4 shows a section along line IV—IV of FIG. 1 in a different scale.

FIG. 5 is a section of an embodiment as in FIG. 3.

FIG. 6 shows another embodiment in a schematic representation and a sectional view as in FIG. 3.

FIG. 7 is a top view of the lower part of a caliper in the direction of the arrow A in FIG. 6.

Figure 1:
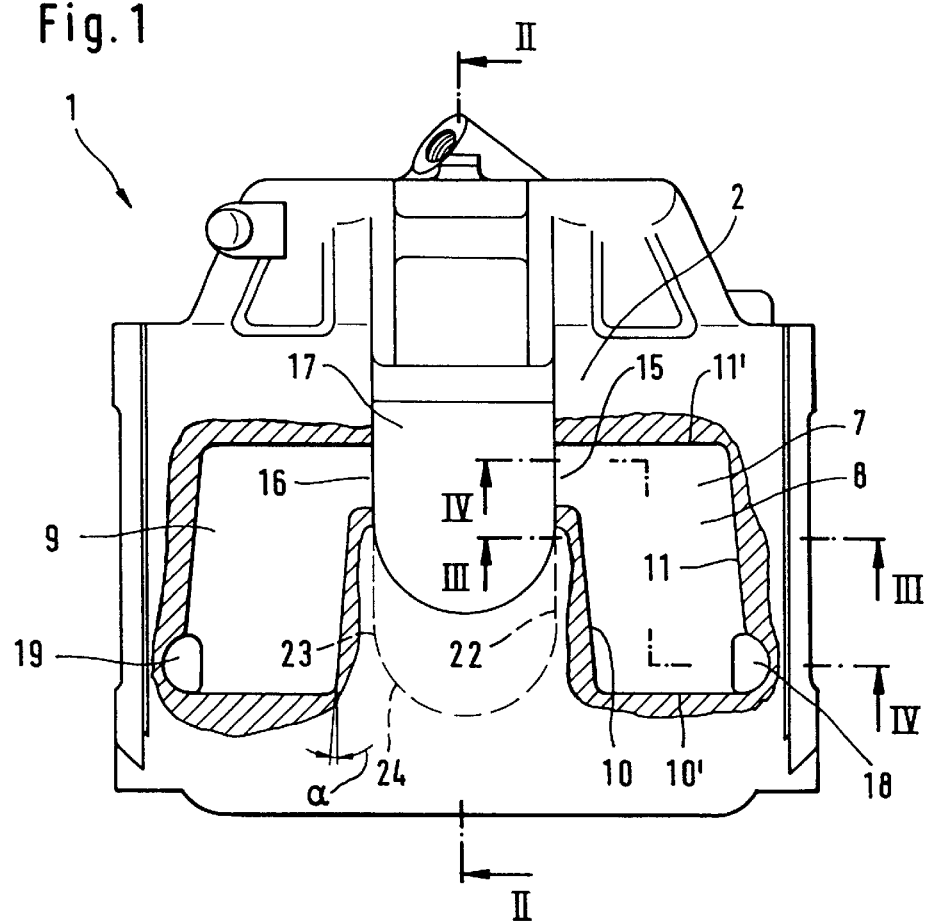
FIG. 1 is a partially profiled top view of a brake caliper.
Figure 2:
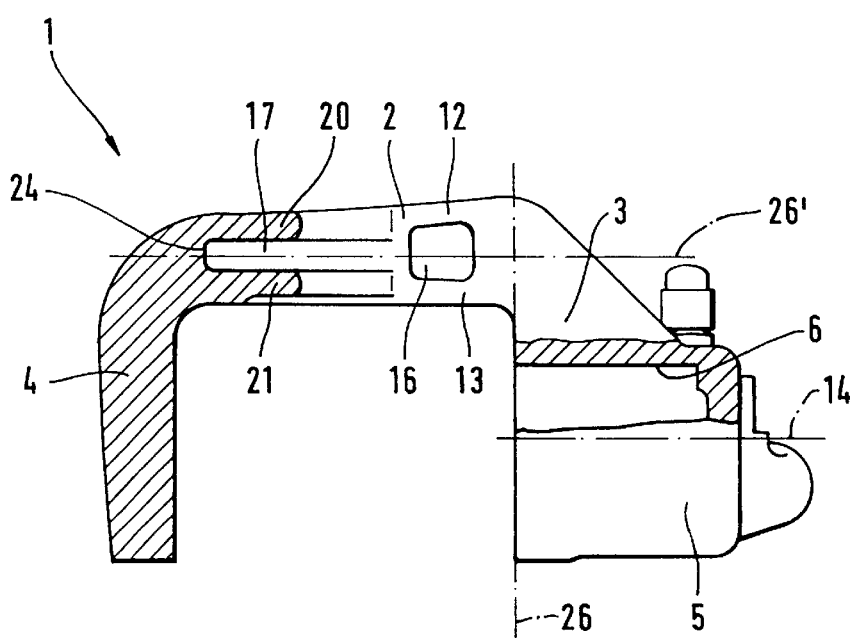
FIG. 2 shows a section along line II—II of FIG. 1.

A brake caliper 1 according to FIGS. 1 and 2 comprises a caliper bridge 2 and two legs 3,4 arranged at right angles to the caliper bridge 2 and opposite one another. A housing 5 with a bore 6 for an actuating cylinder that is not shown is mounted on leg 3. The leg 4 on the side of the fist can have several mutually separated fingers. Inside the caliper bridge 2 there are two hollow chambers 8,9 arranged opposite one another, with such chambers being delimited on all sides by supporting walls 10,10',11,11' as well as by a radial upper and a radial lower wall 12,13. Each chamber 8,9 has an essentially rectangular area and the supporting walls 10,11 are arranged at an angle a to axis 14 of the bore 16, i.e. the supporting walls 10,11 are sloped.

Each chamber has at least one outlet 15,16 that leads to the outside. The outlets run into an opening 17 of the caliper bridge 2 and are positioned opposite and in direct alignment to one another. A bore 18,19 is arranged diagonally to each outlet 15,16 in the area of a corner of each chamber 8,9, and this bore faces radially inwards towards the brake disc. Just like the outlets 15,16 each bore 18,19 serves to ventilate and drain the chambers 8,9.

In order to reinforce the mechanical connection of the leg 4 to the side of the fist, ribs 20,21 partially extend into the opening 17 on the side of the fist. Each of the ribs 20,21 extends from side wall 22 to side wall 23 and gradually runs against the corresponding side wall 22,23. As shown in the top view in FIG. 1, each rib has an essentially semicircular profile and the opening 17 fits closely to the leg 4 with a semicircular end 24 on the side of the fist. The design of the ribs 20,21 and the opening 17 ensure that both the leg 4 and the caliper bridge 2 are supported with flectional strength. It remains to be pointed out that the ribs 20,21 lie on the same level as the upper and lower walls 12,13 of the chambers 8,9.

As shown in FIG. 3, the caliper bridge 2 has a closed hollow cross-section. The chamber 8 which is located within 7 this closed hollow cross-section is delimited by the supporting wall 10 and the upper wall 12 as well as the lower wall 13.

In another embodiment according to FIG. 5, each chamber has rib-like struts 25 that extend from the radial upper wall 12 to the radial lower wall 13. The struts 25 are made of the same material as the caliper bridge 2 and reinforce walls 12,13. The struts 25 are produced with the core for the chambers 8,9, which means there should be recesses having the desired form and cross-section of the struts 25. Every recess in the core results in a strut 25 between the walls 12,13. The struts may have any cross-section. In a preferred embodiment the struts have a honeycombed surface with several corners or an elliptical shape. The wall between the individual struts 25 may have any thickness. As a rule efforts are made to obtain a low wall thickness so that the weight is kept low, too. FIG. 7 shows an embodiment with polygonal cells 28 to form honeycombed walls 27.

Figure 8:
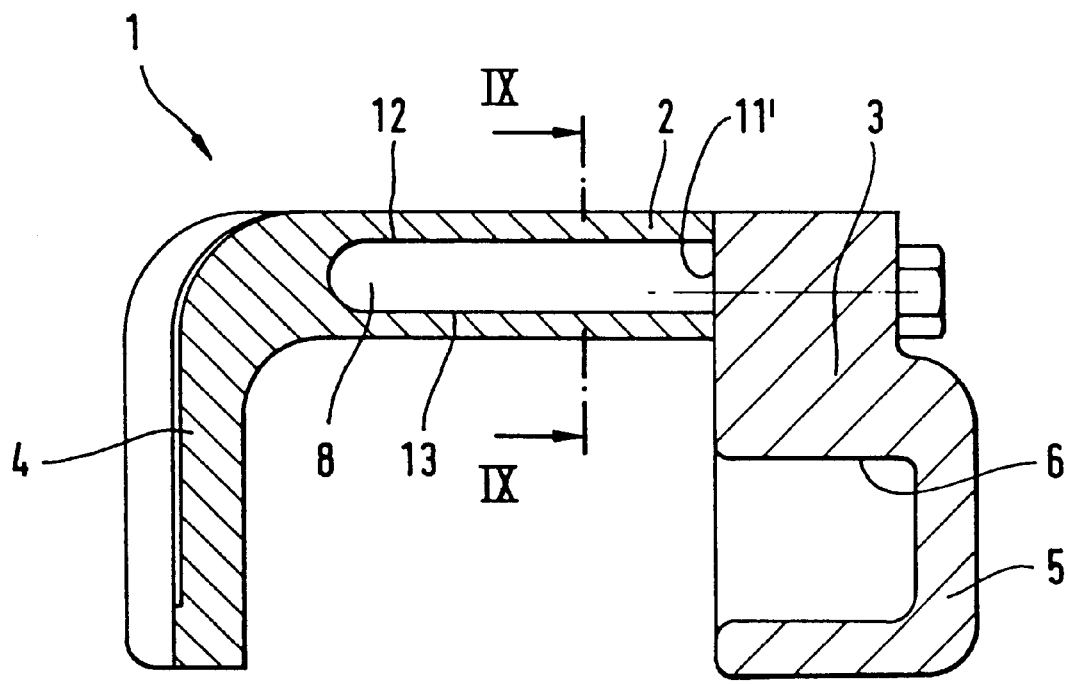
FIG. 8 is a longitudinal section of an embodiment in which the caliper parts are screwed down.
Figure 9:
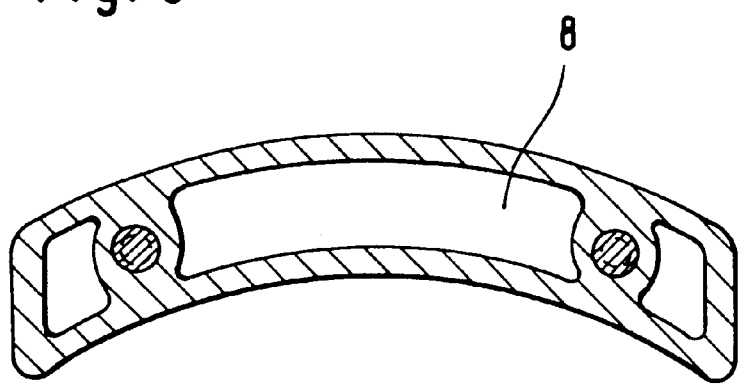
FIG. 9 shows a section along line IX—IX of FIG. 8.

As a rule the brake calipers described above can be made in one piece from one type of material. In one embodiment of the invention, the brake caliper is made in two pieces and of different materials, and the mould joint 26 runs at a right angle to axis 14 of bore 6, as is shown by the dotted line in FIG. 2. In two-piece brake calipers the caliper bridge 2 is attached to the housing 5 in commonly known ways, for example by welding or screwing. A variant of a screwed-down caliper is shown in FIGS. 8 and 9. In this case, leg 3 and housing 5 form a supporting wall of chamber 8.

In another two-piece brake caliper, the mould joint 26' runs parallel to the axis 14 of bore 6, as is shown by the dotted line in FIGS. 2 and 6. The mould joint 26' runs crosswise through chambers 8,9 because this offers the advantage that no core is needed to produce chambers 8,9. Instead the two parts of the caliper have recesses that are in alignment with one another and, hence, these recesses form chambers 8,9 when the halves of the caliper are joined together along the mould joint by means of electron-beam welding. Due to this welding process the heat-affected zone in the material of the caliper is kept very narrow.

Another preferred embodiment of the invention is provided in FIG. 7, which shows a top view of one half of the caliper in the direction of the arrow A in FIG. 6. Each cell 28 is hexagonal and delimited by walls 27. In principle the walls 27 can have any thickness, but the thickness does depend on how many cells 28 are to be provided. It goes without saying that the area of the cells 28 can be changed in any way without affecting the basic idea of the invention. Thus, for example, it would be possible for the cells 28 to have a triangular, square or oval area. With respect to the round struts 25 it would in principle also be possible to have round cells 28. The decisive point in connection with this design, however, is that the parts of the caliper located on the mould joint 26' are welded together along the entire contact surface.

In order to produce a brake caliper according to FIGS. 1 and 2 by casting, a core to make the hollow chambers 8,9 is inserted in a mould with moulding material. The core exhibits undercuts and penetrates at least one outlet 15,16 of each chamber 8,9. In addition, a core print is provided near the opening 17 of the caliper bridge 2, which ensures that the core is in the correct position for the casting operation. After the casting the core and the undercuts as well as the residue of the core are expelled through the outlets 15,16 of each chamber 8,9. A brake caliper 1 with a hollow caliper bridge 2 can be manufactured cost-efficiently by means of this manufacturing process.

What is claimed is:

1. A brake caliper for motor vehicles, comprising:
   a caliper bridge with two legs, said bridge having at least one chamber therewith in, which is delimited on all sides by supporting walls, said legs being arranged at right angles to the caliper bridge, and
   a housing with a bore for an actuating cylinder, said housing being mounted on one of said two legs,
   wherein said at least one chamber exhibits an essentially rectangular area, has at least one outlet leading to the outside and a bore lying in a corner diagonally opposite to the outlet,
   wherein the caliper bridge exhibits two chambers and an opening arranged between the chambers, the outlet of each of said two chambers running into said opening, and
   wherein the opening between the chambers has ribs in the area of the side walls and fist fingers, said ribs being in alignment with the upper wall and the lower wall.

2. A brake caliper according to claim 1, wherein each rib gradually becomes integral with the side wall.

3. A brake caliper for motor vehicles, comprising: a caliper bridge having at least one chamber within, which is delimited on all sides by supporting walls, and two legs arranged at right angles to the caliper bridge,
   wherein a housing with a bore for an actuating cylinder is mounted on one leg,
   wherein the caliper bridge has a closed hollow cross-section, and
   wherein each chamber has struts that extend from one of said walls to another of said walls.

* * * * *